US011138801B2

(12) United States Patent
Krauthamer

(10) Patent No.: US 11,138,801 B2
(45) Date of Patent: Oct. 5, 2021

(54) CORRELATIVE EFFECT AUGMENTED REALITY SYSTEM AND METHOD

(71) Applicant: Universal City Studios LLC, Universal City, CA (US)

(72) Inventor: Akiva Meir Krauthamer, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/779,148

(22) Filed: Jan. 31, 2020

(65) Prior Publication Data

US 2021/0236952 A1    Aug. 5, 2021

(51) Int. Cl.

| G06T 19/00 | (2011.01) |
| G06T 7/20 | (2017.01) |
| A63J 21/00 | (2006.01) |
| G02B 27/01 | (2006.01) |
| A63J 5/02 | (2006.01) |

(52) U.S. Cl.
CPC .............. *G06T 19/006* (2013.01); *A63J 5/02* (2013.01); *A63J 21/00* (2013.01); *G02B 27/0101* (2013.01); *G06T 7/20* (2013.01); *G06T 2207/10152* (2013.01)

(58) Field of Classification Search
CPC . G06T 7/20; G06T 15/50–506; G06T 19/006; G06T 2207/10152; G02B 27/0101; A63J 5/02; A63J 21/00
See application file for complete search history.

(56) References Cited

U.S. PATENT DOCUMENTS

| 8,525,829 | B2 | 9/2013 | Smithwick et al. |
| 9,819,907 | B2 | 11/2017 | McNelley et al. |
| 9,849,399 | B2 | 12/2017 | Crowder et al. |
| 9,939,887 | B2 | 4/2018 | Borke et al. |
| 10,156,730 | B1 | 12/2018 | Comploi et al. |
| 2004/0135744 | A1* | 7/2004 | Bimber ............... G02B 27/017 345/32 |
| 2010/0253700 | A1* | 10/2010 | Bergeron ............... A63J 5/021 345/633 |
| 2012/0313839 | A1 | 12/2012 | Smithwick et al. |
| 2016/0097971 | A1 | 4/2016 | Horikoshi et al. |

(Continued)

FOREIGN PATENT DOCUMENTS

CN    102150081    8/2011

OTHER PUBLICATIONS

PCT/US2021/014425 International Search Report and Written Opinion dated May 4, 2021.

*Primary Examiner* — Diane M Wills
(74) *Attorney, Agent, or Firm* — Fletcher Yoder P.C.

(57) ABSTRACT

An augmented reality system includes a first scene and a second scene. Further, the augmented reality system includes a partially reflective surface positioned relative to the first scene, the second scene, and an audience to facilitate viewing of one of the first scene or the second scene through the partially reflective surface and to facilitate reflection of the other of the first scene or the second scene toward the audience as augmented reality imagery. A sensor of the augmented reality system is designed to detect and generate data indicative of a characteristic of the first scene, and a correlative effect system is operable to receive the data and adjust the second scene based thereon.

20 Claims, 7 Drawing Sheets

(56) References Cited

U.S. PATENT DOCUMENTS

| | | | |
|---|---|---|---|
| 2018/0176506 A1* | 6/2018 | McNelley | H04N 7/147 |
| 2018/0348535 A1* | 12/2018 | Comploi | A63J 5/021 |
| 2019/0294031 A1 | 9/2019 | Ley et al. | |
| 2020/0013223 A1* | 1/2020 | Knorr | H04N 13/239 |
| 2020/0033610 A1* | 1/2020 | Haseltine | G06K 9/00671 |

\* cited by examiner

CORRELATIVE EFFECT AUGMENTED REALITY SYSTEM AND METHOD

BACKGROUND

Amusement park attractions, such as ride systems, may provide entertainment to guests in numerous ways, including displaying augmented reality (AR) images such that the AR images are viewable by a guest. For example, an amusement ride may include a display positioned adjacent to the guest and operate, alone or in coordination with other features, to output the AR images for viewing by the guest. This may be done to create a special effect, such as the illusion of a translucent ghost being present in a staged scene.

One technique for providing such AR images is traditionally referred to as the Pepper's Ghost illusion. This technique for providing AR images is believed to have been developed in the 19th century. The Pepper's Ghost illusion utilizes reflective properties of translucent or transparent materials (e.g., glass, plastic, or polyester foil) to virtually project images into a scene for viewing by an audience. For example, an angled pane of glass may be positioned in front of a stage and imagery may be projected toward the glass from outside of a line of sight of the audience and then partially reflected toward the audience by the pane of glass. Thus, the audience perceives the reflected imagery in conjunction with viewing the scene presented behind the glass and in the line of sight of the audience. Depending on lighting, this can give the reflected imagery a ghostly appearance because light behind the glass remains observable through the reflected imagery. However, lighting techniques can be utilized to make the reflected imagery appear to be more solid by limiting competing light from the background. This type of AR has been utilized for many years and is presently utilized in numerous amusement park attractions. However, it is now recognized that audiences are becoming more sophisticated and capable of identifying the nature of this illusion. Accordingly, it is now recognized that there is a need for improvements in the technology to make the illusion more realistic and immersive.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

An embodiment includes an augmented reality system with a first scene and a second scene. A partially reflective surface is positioned relative to the first scene, the second scene, and an audience to facilitate viewing of one of the first scene or the second scene through the partially reflective surface and to facilitate reflection of the other of the first scene or the second scene toward the audience as augmented reality imagery. A sensor is configured to detect a characteristic of the first scene and generate data indicative of the characteristic. A correlative effect system is configured to receive the data and adjust the second scene based on the data.

An embodiment includes an augmented reality system with a background scene including background scene lighting and an augmented reality scene including augmented reality scene lighting. A partially reflective surface is positioned relative to the background scene, the augmented reality scene, and an audience to facilitate viewing of the background scene through the partially reflective surface and to facilitate reflection of the augmented reality scene toward the audience as augmented reality imagery. A sensor is configured to detect a lighting characteristic of the background scene and generate data indicative of the lighting characteristic. A correlative effect system is configured to receive the data and adjust the augmented reality scene lighting based on the data.

An embodiment includes an augmented reality system with a background scene including a three-dimensional staging area and background scene lighting operable to adjustably illuminate the three-dimensional staging area. The augmented reality system also includes an augmented reality scene including augmented reality scene lighting operable to provide augmented reality imagery. A partially reflective surface is positioned relative to the background scene, the augmented reality scene, and an audience to facilitate viewing of the background scene through the partially reflective surface and to facilitate reflection of the augmented reality imagery toward the audience. A sensor is configured to detect a characteristic of one of the background scene or the augmented reality scene, wherein the sensor is also configured to generate data indicative of the characteristic. A correlative effect system configured to receive the data and adjust an aspect of the other of the background scene or the augmented reality scene based on the data.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
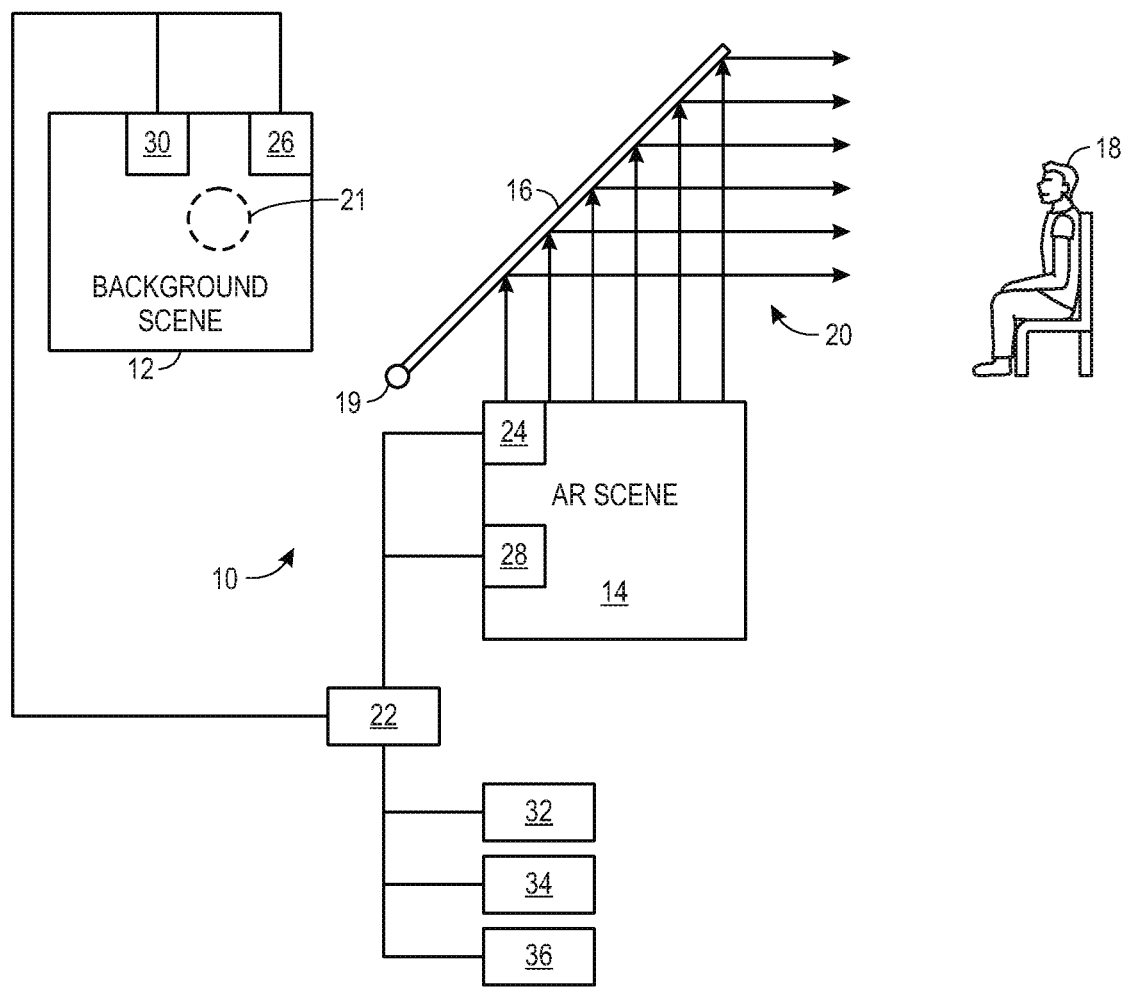
FIG. 1 is a schematic representation of an augmented reality (AR) system arranged for viewing by an audience, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In accordance with present embodiments, an augmented reality (AR) system may include an AR imagery source (e.g., a projector or lighted scene) that operates to project AR imagery onto a partially reflective surface (e.g., glass, plastic, or polyester foil) positioned between an audience (e.g., a viewer) and a background scene, such as a stage, electronic display, screen, or setting. The AR imagery source and background may include combinations of the referenced features. The AR imagery may include any of various images projected onto a screen that reflects it towards an audience to make it appear as though the AR imagery is present relative to the background scene. In some embodiments, the AR imagery may include a character (e.g., a person), a ghost, an object (e.g., a desk), text, a virtual luminous object (e.g., a flame), or the like. In an embodiment, the partially reflective surface may include a semi-transparent mirror that partially reflects the AR imagery from the source towards the audience. In other words, the partially reflective surface reflects the AR scene towards the audience as the AR imagery. The audience may view the AR imagery reflected from the semi-transparent mirror as overlapping the background scene, which may include physical props, an electronic display (e.g., a projector screen, or a liquid crystal display) or both. In this way, the AR imagery may be made to appear to the audience as though it is interacting with and/or positioned proximate features of the background scene. To bolster this effect, the AR imagery may include three-dimensional (3D) imagery, which may be described as two-dimensional imagery that appears to be three-dimensional when viewed through an appropriate lens (e.g., polarized or colored lenses of 3D glasses).

The semi-transparent mirror, which is representative of various other partially reflective surfaces (e.g., glass, mesh), may be positioned at an angle relative to the audience and the AR imagery source such that what may be described as a Pepper's Ghost effect can be created. The Pepper's Ghost effect includes reflecting the AR imagery such that a viewer may simultaneously view the AR imagery on the partially reflective surface in conjunction with features located on an opposite side of the partially reflective surface. Specifically, the Pepper's Ghost effect may cause the AR imagery to appear overlaid on objects or images positioned behind the partially reflective surface. For example, a human figure presented as the AR imagery and reflected by the partially reflective surface may appear to sit in an actual chair that is posed on a stage behind the partially reflective surface with respect to an audience's point of view.

The scene behind the partially reflective surface, which is directly viewed by the audience may be referred to as the background scene. The scene that provides the AR imagery, which is viewed by the audience after reflection from the partially reflective surface, may be referred to as the AR scene. The background scene and the AR scene may include physical components (e.g., stage props, actors, structures) and/or electronic displays (e.g., projectors, liquid crystal display, lighting panels). For example, the background screen may include a screen onto which video is projected (e.g., a movie screen) while the AR scene may include lighted props and actors positioned to cause light to reflect off of the partially reflective surface. In this example, the AR scene may be set up in a chamber beneath the stage that is not directly viewable by the audience but positioned to direct light toward the partially reflective surface for reflection toward the audience.

In another example, an opposite or different combination of features may be used for each of the background scene and AR scene. Because the imagery provided by the background scene and AR scene combines to provide the Pepper's Ghost effect, the relative lighting of each scene impacts the nature of the effect with respect to how it is viewed by the audience. For example, if the background scene is substantially brighter than the AR scene, the audience may barely perceive the AR imagery reflected toward them. However, if the background scene is substantially darker than the AR scene, the AR imagery may be dominant and the background scene may not be visible to the audience. Further, because the AR imagery is being provided to the audience for viewing by reflection, the features of the AR imagery being displayed (e.g., a character moving about) do not light the background scene in a manner that an audience would expect an actual feature to do. For example, AR imagery of a particular feature (e.g., a person, a lamp, or a car) would not cause an actual mirror in the background scene to properly reflect that feature. Likewise, the AR imagery of what would typically be a light emitting feature (e.g., a lamp, flashlight, flame or other luminous object) would not cause light and corresponding shadows to be generated in the background scene.

Present embodiments include monitoring systems that track the lighting in one or both of the background scene and the AR scene to coordinate the lighting effects and achieve desired overlapping perception of the combined imagery from the background and AR scenes. Additionally, present embodiments include lighting features that emulate the expected lighting effects of features provided in AR imagery such that the background scene is impacted in the manner expected by the audience, which improves the immersive nature of the presentation. Present embodiments also include tracking systems that operate to track features in the background scene to provide desired AR imagery that correlates thereto. For example, a physical lantern or the like may be moved around in the background scene and tracked to provide positioning information for the lantern. This positioning information may be used to provide AR imagery in positions on the partially reflective surface to correlate to the position of the lantern such that the combined background scene and AR imagery make the lantern appear to the audience as though it is lit and shining. Specifically, a luminous object, such as a flame, may be projected onto the partially reflective surface or screen in a location that makes the audience see the luminous object as tracking with the physical position of the lantern. Further, background scene lighting may be adjusted to cast shadows as though resulting from the faux light of the lantern, for example.

FIG. 1 is a schematic representation of an AR system 10 in accordance with an embodiment of the present disclosure. The AR system 10 includes a background scene 12, an AR scene 14, and a partially reflective surface 16 (which may also be referred to as a partially reflective layer or screen 16) disposed therebetween. An audience 18 is positioned such that AR imagery 20, which includes light reflected from the AR scene 14, is reflected from the partially reflective surface 16 toward the audience 18 in a manner that makes the AR imagery 20 appear as though positioned in the background scene 12, as illustrated by virtual image 21 in dashed lines. Further, the background scene 12 is positioned such that the audience 18 can view it directly through the partially reflective surface 16, which is also partially transparent. The background scene 12 and the AR scene 14 may be defined by any combination of physical props, live actors, electronically generated imagery, and the like. For example, the background scene 12 may include a stage with physical features (e.g., chairs, tables, and live actors), while the AR scene 14 may include a projector that directs the AR imagery 20 toward the partially reflective surface 16. In other embodiments, different combinations of physical features and electronically generated imagery may be used, including both in each of the background scene 12 and AR scene 14. The partially reflective surface 16 may include a special foil, glass, plastic, partial mirror, or the like that is operable to allow the audience 18 to both see through it and observe imagery reflected off of it in appropriate lighting conditions. The AR system 10 also includes a correlative effect system 22 which may be a controller designed to operate with various sensors 24, 26 and lighting systems 28, 30 to provide desired effects in accordance with an embodiment. Further, in an embodiment in accordance with the present disclosure, the correlative effect system 22 may actually include the sensors 24, 26 and the lighting systems 28, 30. In some embodiments, only one sensor 24, 26 may be used to monitor one or both of the background scene 12 and the AR scene 14.

Specifically, the AR system 10 includes the correlative effects system 22 which has features that allow the AR system 10 to correlate aspects of the AR scene 14 with aspects of the background scene 12 in a manner that increases immersion of the audience 18 in the AR illusion being provided by the AR system 10. The AR system 10 may also include features, such as actuators 19, that facilitate manipulation (e.g., repositioning) of the partially reflective surface 16 to achieve certain correlative results.

The AR system 10 and/or correlative effectives system 22 may include one or more controllers 32, processors 34, and/or memories 36 to perform various functions (e.g., instructing operation of other system features). The one or more memories 36 may include random access memory (RAM), read-only memory (ROM), rewritable non-volatile memory such as flash memory, hard drives, optical discs, and/or other types of memory. The one or more processors 34 of the AR system 10 may include one or more general purpose microprocessors, one or more application-specific integrated circuits (ASICs), and/or one or more field programmable gate arrays (FPGAs). The one or more controllers 36 may include programmable logic controllers (PLCs) or other computer-based controllers. These features (e.g., controllers 36, processors 34, and memories 32) may be components of the correlative effects system 22 or separate features. Further, these features may operate using stored instructions (e.g., code) that, when executed, initiates action (e.g., dimming of lighting or manipulation of actuators), as would be understood.

In one example, the AR system 10 may operate to correlate lighting characteristics between the AR scene 14 and the background scene 12 to improve coordination between the AR imagery 20 and the directly viewable aspects of the background scene 12. For example, it may be desirable to make adjustments so that the AR imagery 20 has similar coloring to that of the background scene 12. This may be achieved by observing lighting characteristics in either the AR scene 14 or the background scene 12 via the sensors 24, 26 and making corresponding lighting changes in the other of the AR scene 14 or the background scene 12 via the lighting systems 28, 30. One or both sensors 24, 26 may be included and/or used in a particular system. Examples of lighting characteristics that can be detected and adjusted include intensity, position/direction, brightness, color, temperature, contrast, and quality. A characteristic of one scene can be modified based on a different characteristic of the other scene. For example, the correlative effects system 22 may operate to adjust brightness in the background scene 12 based on a contrast in the AR scene 14. Present embodiments may detect and adjust lighting in either (or both) of a physical (e.g., a theatre stage) or a virtual scene (e.g. a scene provided by an electronic display, such as a liquid crystal display or a projector). For example, in an embodiment where one or both of the background scene 12 and AR scene 14 include electronic displays, the sensors 24, 26 may detect display settings (e.g., a color setting), and the lighting systems 28, 30 may control display settings based on output from the sensors 24, 26. In addition to lighting changes, present embodiments may adjust the physical positioning of the partially reflective surface 16. For example, an angle of the partially reflective surface 16 relative to the background scene 12, the AR scene 14, and the audience 18 may be adjusted with the actuators 19 based on instructions from the correlative effects system 22 to achieve a desired viewing result.

Figure 2:
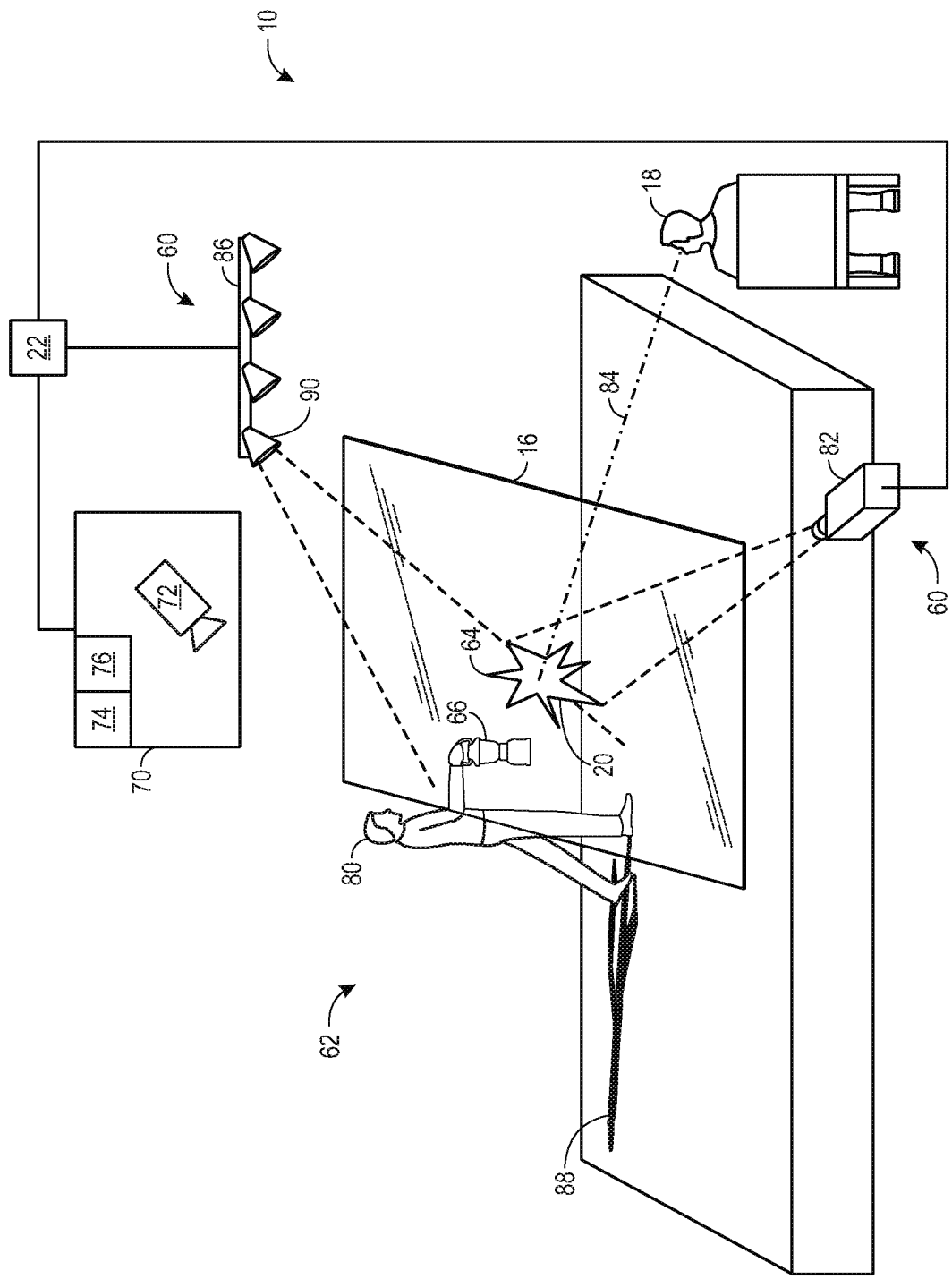
FIG. 2 is a schematic perspective view of an embodiment of the AR system in which projection sources operate to adjust the lighting of a stage with respect to a virtual luminous object and adjust positioning of presentation of the virtual luminous object with respect to a physical object, in accordance with an embodiment of the present disclosure.

FIG. 2 is a schematic perspective view of an embodiment of the AR system 10 in which projection sources 60 operate to adjust the lighting of a stage 62 with respect to a virtual luminous object 64 and adjust positioning of the virtual luminous object 64 with respect to a physical object 66, in accordance with an embodiment of the present disclosure. In the illustrated embodiment of FIG. 2, the background scene 12 incorporates the stage 62 and the physical object 66, which is a moving background object. This physical object 66 could be any number of movable objects. For example, the moving object could be a robotic figure, a torch, a sword, an actor, or any other trackable object. However, in the illustrated embodiment, the physical object is a prop lantern that does not actually emit light on its own.

A tracking system 70 is included to facilitate tracking physical movement in the background scene 12. For example, the illustrated tracking system 70 includes a sensor (e.g., a camera) 72, processor 74, and a memory 76 that coordinate to track the physical object 66 and/or an actor 80 in space. By tracking these physical aspects (e.g., the physical object and the actor 80) in the background scene 12, appropriate lighting adjustments to the lighting system 60 can be made to make the augmented reality presentation of the AR system 10 more immersive. For example, AR imagery 20 may be presented, via a projector 82 of the lighting system 60, on the partially reflective surface 16 such that the positioning of the AR imagery 20 correlates to the positioning of the physical object 66 with respect to a line of sight 84 for the audience 18. The illustrated projector 82 is representative of a wide range of image-generating devices that may be employed to achieve the desired effects. For example, the projector 82 may represent a flat screen television that generates an image of a flame, which is in turn reflected by the partially reflective surface 16 to create the illusion that the flame is actually positioned on or within the physical object 66. In other embodiments, the projector 82 may include a screen that receives an image via front-projection or rear-projection. As with the flat screen television, the image provided on the screen may be reflected by the partially reflective surface 16 to create the desired illusion. The projector 82 may be representative of any device that would operate to provide the desired imagery. Further, in some embodiments, the projector 82 could be replaced with a physical feature (e.g., a lit candle) that could be maneuvered around a space via actuators to provide a reflection that correlates with desired positioning of the illusory image relative to the stage 62.

With the foregoing in mind, the combined actions of the tracking system 77 and the lighting system 60 may allow the AR system 10 to make the physical object 66, a non-functioning lantern prop in the illustrated embodiment, appear as though it is lit and emitting a flame because the AR imagery 20 represents a flame and is appropriately positioned. Further, stage lights 86 of the lighting system 60 may be operated to project a shadow 88 that correlates to a positioning of the AR imagery 20. In the illustrated embodiment, for example, the shadow 88 may be cast by operating one or more specific lamps 90 of the stage lights 86 to make it appear as though the AR imagery 20 is causing the shadow 88. The correlative effects system 22 (e.g., an automation controller) may be employed for this purpose by taking inputs from the tracking system 70 and providing outputs to the lighting system 60. The correlative effects system 22 may also use known positioning information (e.g., a defined route for the physical object 66 and/or the AR imagery 20) to control the lighting system 60 to provide correlative and immersive effects. For example, the lantern prop may be maneuvered across the stage 62 using automation and the pattern of traversal may be coordinated with the projector 82 to provide the desired effect. Such an embodiment would improve efficiency and eliminate processing time and/or costs associated with tracking physical features (e.g., the physical object 66).

The physical object 66 and/or actor 80 may be trackable by the tracking system 70 because of one or more features (e.g., shape, color, facial features, or RFID) that enable detection or recognition by the tracking system 70. For example, in one embodiment, the tracking system 70 is programmed to identify a particular shape of the physical object 66 and track movement of the physical object 66 so that location data (e.g., a current location) can be readily identified in essentially real time. To achieve this, the memory 76 and processor 74 may execute programming (e.g., object recognition or facial recognition programs) to interpret data and/or extrapolate from data obtained from the sensor 72. Using the location data obtained by the tracking system an appropriate location for use in controlling the lighting system 60 can be identified.

Figure 3:
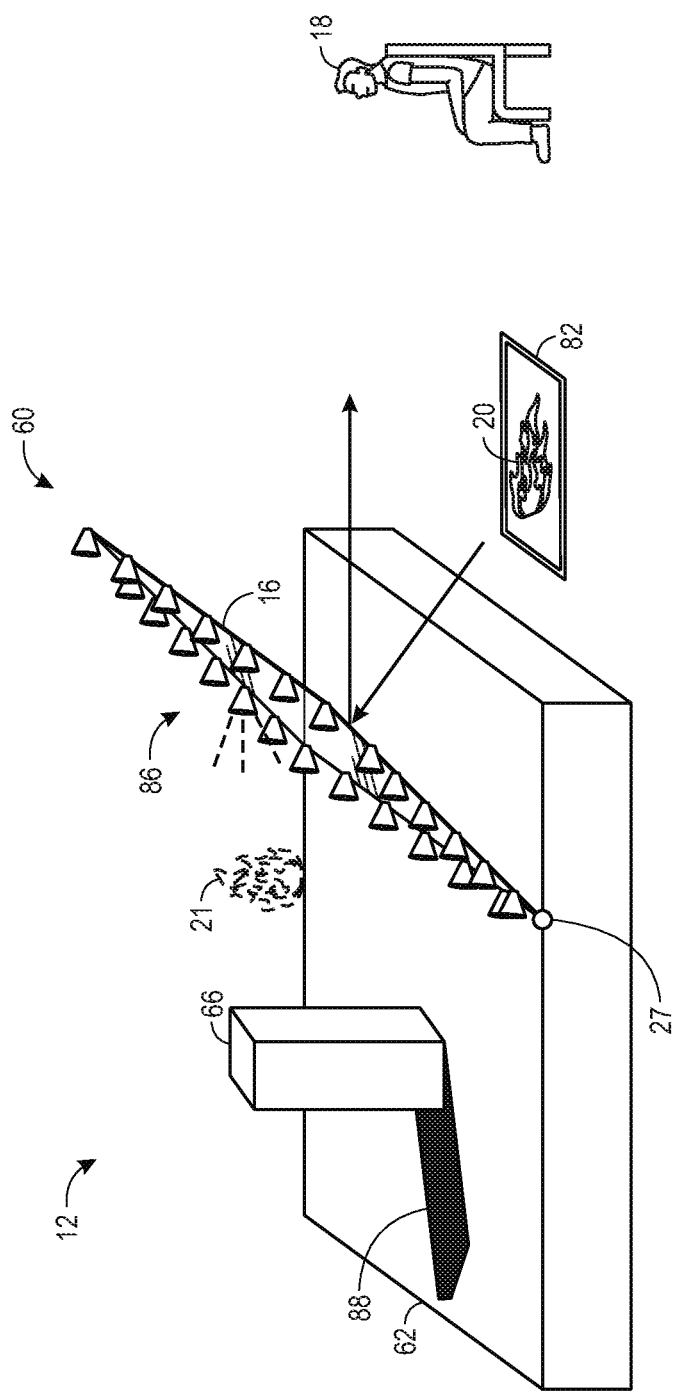
FIG. 3 is a schematic perspective view of an embodiment of the AR system in which a lighting system is arranged proximate a border of a partially reflective surface and operable to adjust lighting of a stage with respect to the virtual luminous object, in accordance with an embodiment of the present disclosure.

FIG. 3 is a schematic perspective view of an embodiment of the AR system 10 in which the stage lights 86 of the lighting system 60 are arranged proximate a border 102 of the partially reflective surface 16 and operable to adjust lighting of the stage 62 of the background scene 12 with respect to AR imagery 20, which is presented in the illustrated embodiment as a virtual luminous object and, specifically, a virtual flame. The audience 18 may perceive the virtual flame as present in the middle of the stage 62 and in front of the physical object 66, as generally indicated by the virtual image 21 in dashed lines. The embodiment illustrated in FIG. 3 is arranged to operate in a manner similar to that previously described with respect to the embodiment of the AR system 10 described with respect to FIG. 2. That is, the AR imagery 20, which is a virtual luminous object, is projected by the projector 82 onto the partially reflective surface 16, so as to appear to be positioned within the three-dimensional space of the background scene 12 and to interact with a background object 66 to generate the shadow 88. In this embodiment, however, the stage lights 86 are mounted onto or proximate edges of the partially reflective surface 16. This positioning allows various lamps 90 (e.g., LED lights) of the stage lights 86 to be activated based on positioning of the AR imagery 20 to cause a realistic impact on the background scene 12, which in the illustrated embodiment is the shadow 88, which appears to be caused by the virtual flame represented as the virtual image 21.

As can be appreciated, if the AR imagery 20 represents a flickering flame that is moving around the partially reflective surface 16 to mimic the flickering flame moving around the three-dimensional scene, the stage lights 86 may move around to cast different shadows based on the mimicked positioning and also flicker to cause appropriate shadow formation. In some embodiments, while the lamps 90 themselves do not move, different lamps positioned partially or completely around the partially reflective surface 16 may be activated to achieve a similar effect, such as in the embodiment of FIG. 3. Using such techniques and systems, even observers in the audience 18 that have seen numerous Pepper's Ghost illusions will be more immersed in the effect. It should be noted that the positioning of the various lamps 90 may also be adjusted in combination with activation of different lamps 90 at different positions. For example, where the various lamps 90 are coupled to the border 102, the lamps 90 may be moved by moving the entire partially reflective surface 16 using the actuators 27 to achieve a desired viewing result. In other embodiments, separate actuators may be used for each lamp 90.

Figure 4:
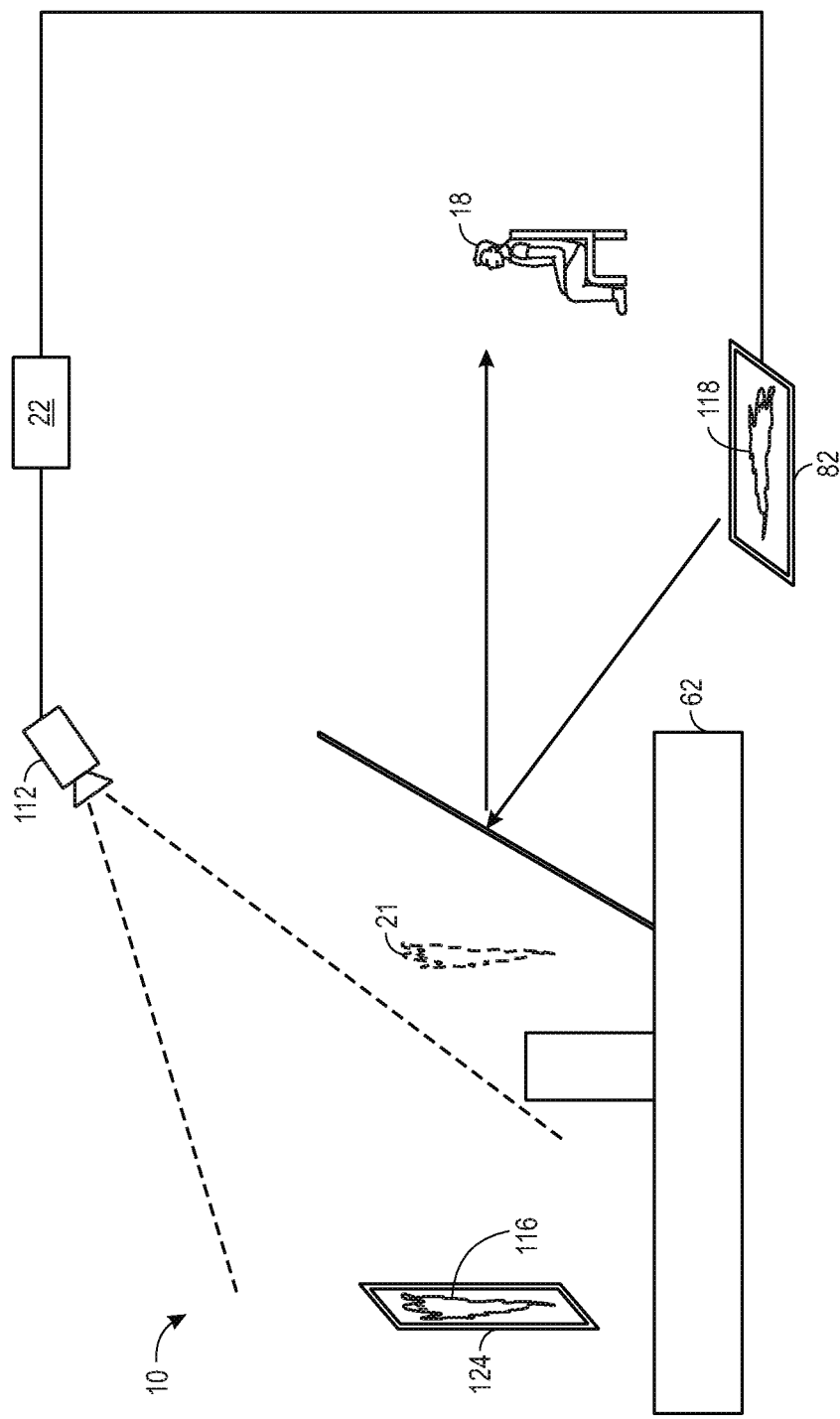
FIG. 4 is a side schematic view of the AR system in which an image source operates to display or mimic a reflection of a virtual object onto items in a background scene, in accordance with an embodiment of the present disclosure.

FIG. 4 is a side schematic view of the AR system 10 in which a projection source 112 (e.g., a movie projector, a television screen, a projection screen) operates to display or mimic a reflection by displaying an image 116 of a virtual object 118 provided by the AR imagery 20 onto a surface 124 in the background scene 12, which in the illustrated embodiment includes a faux mirror positioned on the stage 62. In other embodiments, the surface 124 may be representative of other items, such as a glossy piece of furniture, a glass window, a set of dishes, a metal panel, or the like. Specifically, in the illustrated embodiment of FIG. 4, the background scene 12 of the AR system 10 includes the faux mirror as the surface 124, wherein the faux mirror is actually a projection surface for presenting the image 116 to the audience. Because the virtual object 118 will only appear to be positioned as the virtual image 21, it will not actually cause a reflection in a real mirror (or other shiny surface) in the background scene 12. Accordingly, present embodiments achieve the appearance of such a reflection and increase audience immersion by mimicking an actual reflection.

The faux mirror is actually a prop that mimics the reflective properties of a mirror by displaying the image received from the projection source 112, which is positioned in front of the surface 124 in the illustrated embodiment. In other embodiments, rear projection may be employed. In still other embodiments, the projection source 112 and the surface 124 may be combined features, such as a flat screen television. In order for the background scene 12 to seem realistic and increase immersion of the audience 18 into the presentation, the correlative effects system 22 coordinates operation of the projection source 112 and the projector 82. For example, movement of the virtual object 118 provided by the projector 82 is coordinated with the image 116 provided by the projection source to provide the illusion that the surface 124 is reflecting the virtual object 118. In some embodiments, this may include modifying data from the virtual object 118 to provide the image 116. For example, depending on the surface being mimicked (e.g., a slightly glossy paint on furniture), the image 116 may need to appear blurred. It should be noted that the projection source 112 and the projector 82 may be representative of any number of image-providing features. For example, either of these features may represent a display screen, a lighted stage, a traditional projector, and so forth.

Figure 5:
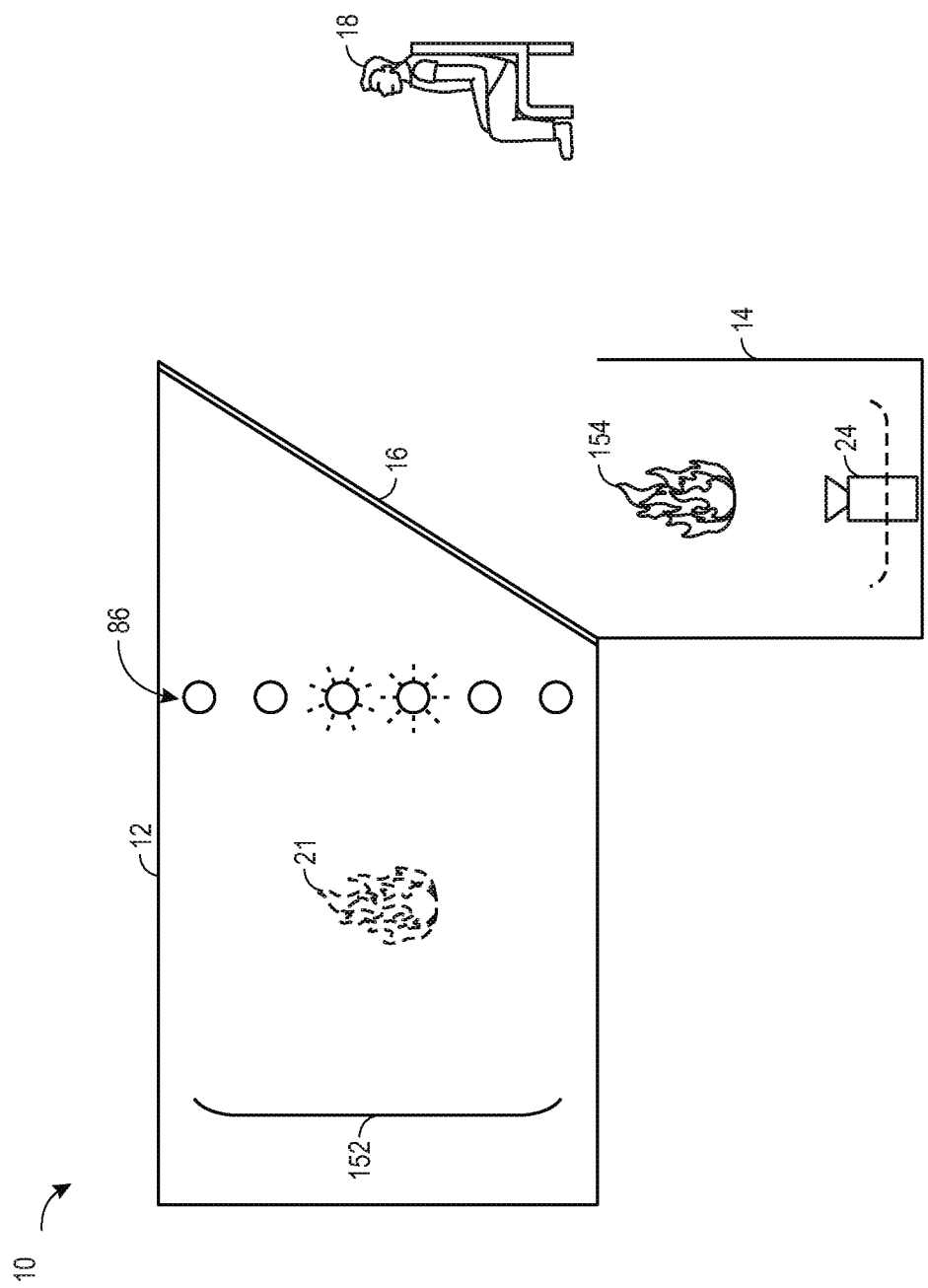
FIG. 5 is a side schematic view of the AR system in which stage lights operate to mimic a reflection of a virtual image onto items in a background scene, in accordance with an embodiment of the present disclosure.

FIG. 5 is a side schematic view of the AR system 10 in which stage lights 86 operate to mimic a reflection of the virtual image 21 onto items in a background scene 12, in accordance with an embodiment of the present disclosure. In the illustrated embodiment, a physical reflective object 152 (e.g., a shiny ball, an hour glass, a glossy painting, a glossy piece of furniture) is positioned in the background scene 12. In the AR scene 14, a physical illuminating object 154 (e.g., a projector, a television screen, a candle, an object under lighting) is positioned such that imagery of the physical illuminating object 154 reflects from the partially reflective surface 16 toward the audience 18 in a manner that creates the illusion that the physical illuminating object 154 is actually present in the background scene 12 and positioned as the virtual image 21. The sensor 24 (e.g., a camera) operates to detect the lighting conditions that would exist at the surface of the physical reflective object 152 if the physical illuminating object 154 were actually positioned in the background scene 12 as the virtual image 21. In an embodiment, this can be based on the sensor 24 viewing the physical illuminating object 154 from a position that would correspond to the physical reflective object 152 if the virtual image 21 were actually present in the background scene 12. For example, the sensor could be positioned at a 45 degree angle with respect to the physical illuminating object 154 in the AR scene because a shiny rubber ball is positioned at a 45 degree angle with respect to where the virtual image 21 appears to be in the background scene 12. Further, such information can be calculated using modeling techniques and an approximation may be sufficient to provide the desired illusion. Such techniques may be applied where the virtual image 21 is based on an image displayed by a screen (e.g., a television screen). The data thus obtained from the sensor 24 may then be used to generate light from the stage lights 85 that will be projected or reflected into the background scene 12 in an appropriate manner. For example, in the illustrated embodiment of FIG. 6, a central pair of the stage lights 85 have been selected to be active based on the data create the desired reflective effect. Because the resulting lighting effects will match both position and quality of the light that would have hit the physical reflective object 152 if it were positioned as perceived with respect to the virtual image 21, the physical reflective object 152 will react to that projected light in an accurate and believable way.

Figure 6:
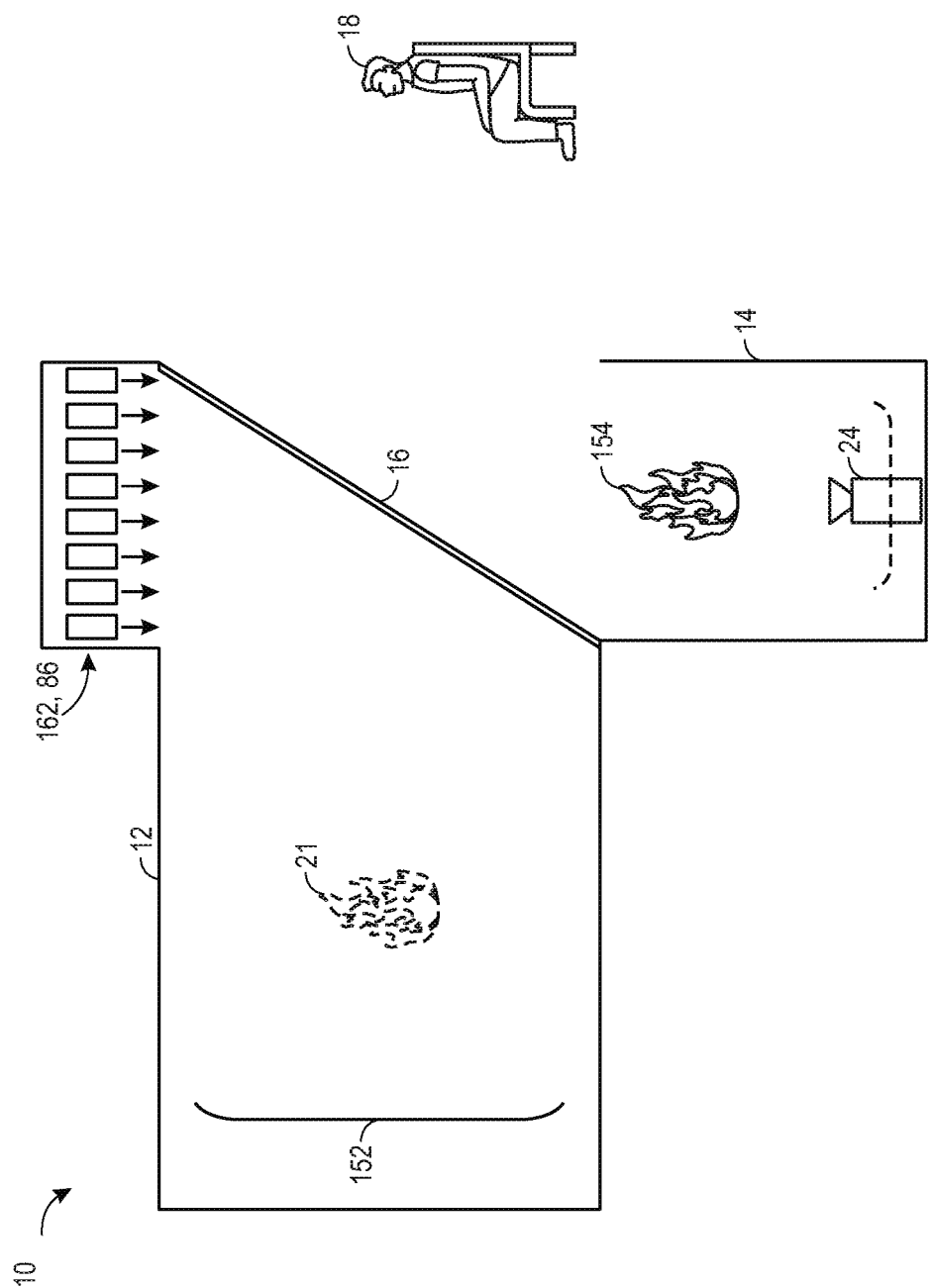
FIG. 6 is a side schematic view of the AR system in which a lighting array operates to mimic a reflection of a virtual image onto items in a background scene, in accordance with an embodiment of the present disclosure.

FIG. 6 is a side schematic view of the AR system 10 in which a lighting array 162 (e.g., a planar array of collimated lights, a light field display, a panel of lasers) operates to mimic a reflection of the virtual image 21 onto items in the background scene 12, in accordance with an embodiment of the present disclosure. The AR system 10 of FIG. 6 is set up in a manner that is similar to the embodiment set forth in FIG. 5. However, the stage lights 86 in the illustrated embodiment of FIG. 6 include a lighting array 162. The lighting array 162 may include any of various focused lighting systems that can direct points of light to specific locations without an associated light cone substantially expanding and causing blurring or the like. Using data obtained from the sensor 24, in a manner similar to that described with respect to FIG. 5, the lighting array 162 may direct light in desired patterns toward the back of the partially reflective surface 16 such that the light gets appropriately reflected into the background scene 12. For example, in an embodiment where the lighting array 162 includes a light field display, specific rays of light may be directed to converge at the perceived location of the virtual image 21 (based on data from the sensor 24 indicative of the perceived location) and then diverge from there in a manner similar to what would occur if the virtual image 21 were actually present. This may facilitate a highly accurate illusion of a specular reflection of the virtual image 21 on the physical reflective object 152.

Figure 7:
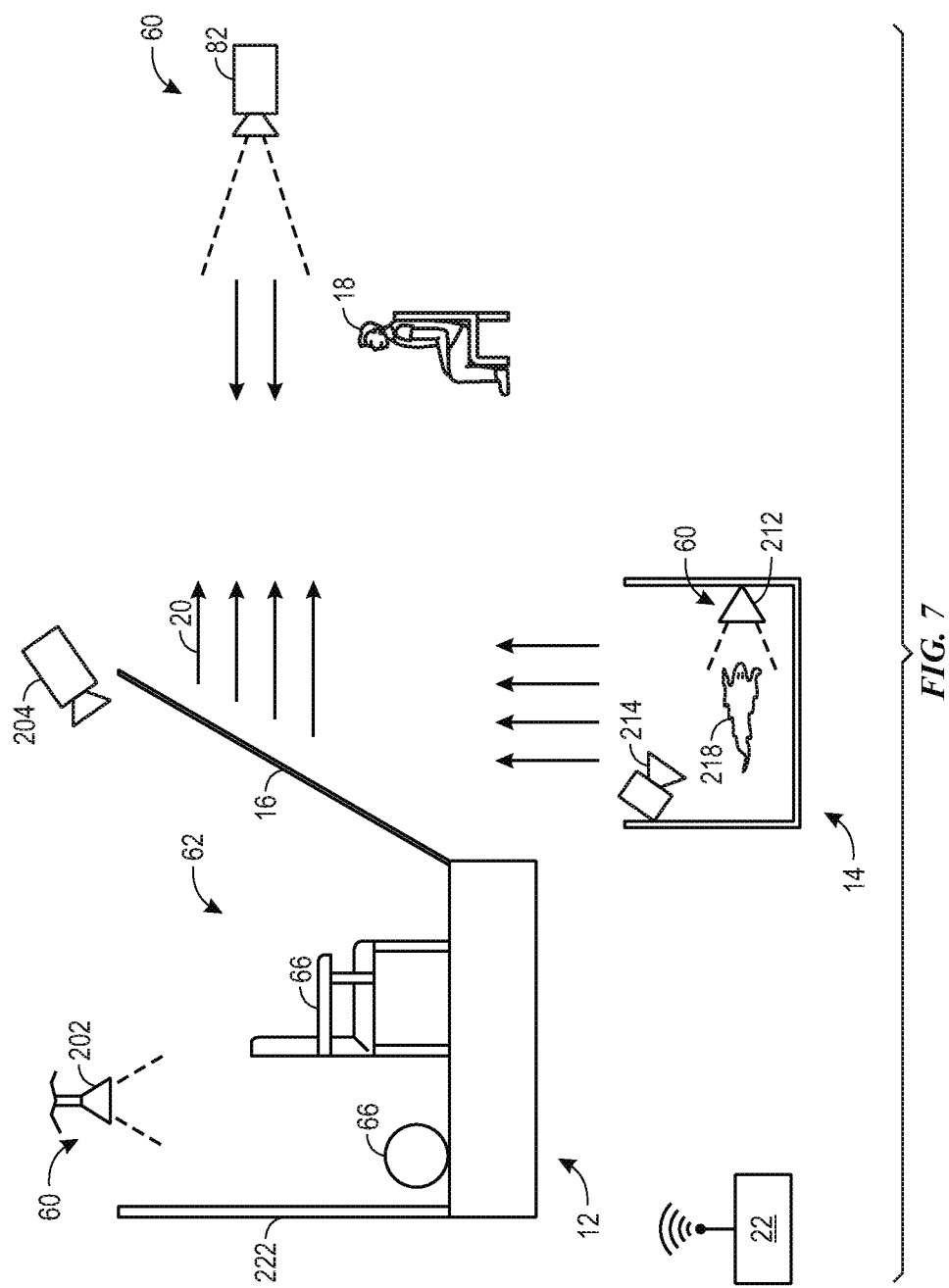
FIG. 7 is a schematic perspective view of the AR system in which the lighting of multiple three dimensional scenes involved in an augmented reality display are monitored by lighting detectors to facilitate adjusted lighting of one or more of the multiple scenes, in accordance with an embodiment of the present disclosure.

FIG. 7 is a schematic perspective view of the AR system 10 in which the lighting of multiple three-dimensional scenes involved in an augmented reality display are monitored by lighting detectors to facilitate adjusted lighting of one or more of the multiple scenes, in accordance with an embodiment of the present disclosure. In the illustrated embodiment, both the background scene 12 and the AR scene 14 are three-dimensional staging areas. The background scene 12 is lit by background scene lighting 202 and this lighting is monitored by a background scene sensor 204 (e.g., a camera). The AR scene is lit by AR scene lighting 212 and this lighting is monitored by an AR scene sensor 214. A prop 218 in the AR scene 14 reflects light from the AR scene lighting 212 toward the partially reflective surface 16, which is then directed toward the audience 18. The combined lighting of the background scene 12 and AR scene 14 may be controlled by the correlative effects system 22, which in the illustrated embodiment communicates wirelessly with the lighting system 60 and related sensors 204, 214.

In an embodiment, the correlative effects system 22 may control the lighting system 60 such that the AR imagery 20 appears translucent to the audience 18, which may provide a ghostly effect to the AR imagery 20. Such control by the correlative effects system 22 may be based on sensor data from the background scene sensor 204 and/or the AR scene sensor 214. Lighting adjustments to the background scene lighting 202 and the AR scene lighting 212 may also be made by the correlative effects system 22, based on sensor data from the background scene sensor 204 and/or the AR scene sensor 214, to make other adjustments to the viewing experience. For example, the AR imagery 20 may be made to appear more solid or various adjustments may be made to better correlate (e.g., coordinate coloring, contrast) of the background scene 12 and the AR scene 14. It should be noted that, while FIG. 5 illustrates a specific embodiment wherein the background scene 12 and the AR scene 14 are provided by three-dimensional stage settings, multiple different features can combine to form the background scene 12 and the AR scene 14. For example, the projector 82 may be part of the lighting system 60 and operate to facilitate provision of extra AR imagery 20. As another example, a display 222 (e.g., LCD screen or projection screen) may facilitate provision of the background scene 12 in conjunction with the physical objects 66 of the stage 62. Each of these features (e.g., the display 222, the projector 82, the lighting 202, 212) may be coordinated by the correlative effects system 22 to provide an immersive presentation of augmented reality to the audience by coordinating effects to provide expected image results in accordance with present embodiments.

Various aspects of the present disclosure are illustrated by FIGS. 1-5 and their corresponding descriptions. For example, FIG. 4 provides an example of the AR system 10 providing faux reflections of AR imagery 20 in the background scene 12, while FIG. 5 provides an example of a particular arrangement of three-dimensional staging areas as the background scene 12 and AR scene 12 and those scenes being used to provide coordinated lighting in an AR presentation. These are particular aspects of embodiments that are provided to convey broader features that are covered by the present disclosure and that can be combined in various ways to achieve different and combined results. For example, faux reflections such as those described with respect to FIG. 5, may be provided in coordination with various implementations of the present disclosure, such as in conjunction with the lighting arrangement of FIG. 3. Indeed, the present disclosure covers all combinations of the disclosed features of the AR system 10.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An augmented reality system, comprising:
a first scene;
a second scene;
a partially reflective surface positioned relative to the first scene, the second scene, and an audience to facilitate viewing of the first scene through the partially reflective surface and to facilitate reflection of the second scene toward the audience as augmented reality imagery;
a sensor configured to detect at least one characteristic of the first scene and generate data indicative of the at least one characteristic, wherein the at least one characteristic comprises a positioning of a physical object in the first scene; and
a correlative effect system that comprises one or more processors and a memory, accessible by the one or more processors, wherein the memory stores instructions that, when executed by the one or more processors, cause the one or more processors to
receive the data and adjust the second scene based on the data by instructing one or more actuators to reposition the partially reflective surface such that the augmented reality imagery is positioned relative to the positioning of the physical object.

2. The augmented reality system of claim 1, wherein the first scene comprises first lighting, the second scene comprises second lighting, the at least one characteristic comprises a lighting characteristic, and the correlative effect system is configured to adjust the second lighting based on the lighting characteristic of the first scene.

3. The augmented reality system of claim 2, wherein the first scene is a background scene, the first lighting is background scene lighting, the second scene is an augmented reality scene, and the second lighting is augmented reality lighting.

4. The augmented reality system of claim 2, wherein the first scene is an augmented reality scene, the first lighting is augmented reality lighting, the second scene is a background scene, and the second lighting is background scene lighting.

5. The augmented reality system of claim 1, wherein the second scene comprises an image generator and the correlative effect system is configured to adjust a color, a contrast or a combination thereof of an image provided by the image generator based on the data, wherein the data is indicative of lighting of the first scene.

6. The augmented reality system of claim 1, comprising an image generator configured to mimic a reflection of the augmented reality imagery in the first scene based on the data.

7. The augmented reality system of claim 1, wherein the first scene comprises a three-dimensional stage setting and the sensor comprises a camera configured to detect lighting characteristics of the three-dimensional stage setting.

8. The augmented reality system of claim 1, wherein the first scene comprises an electronic display.

9. The augmented reality system of claim 1, wherein the sensor is one of a plurality of sensors configured to monitor one or both of the first scene and the second scene for movement and lighting characteristics.

10. The augmented reality system of claim 1, wherein the correlative effect system is configured to adjust lighting of the first scene to create shadows in the first scene based on a position of a virtual luminous object of the augmented reality imagery on the partially reflective surface.

11. The augmented reality system of claim 1, wherein the first scene, the second scene, or both comprise one or more projectors, one or more liquid crystal displays, one or more lighting panels, or any combination thereof.

12. An augmented reality system, comprising:

a background scene including background scene lighting;

an augmented reality scene including augmented reality scene lighting; a partially reflective surface positioned relative to the background scene, the augmented reality scene, and an audience to facilitate viewing of the background scene through the partially reflective surface and to facilitate reflection of the augmented reality scene toward the audience as augmented reality imagery;

a sensor configured to detect a lighting characteristic of the background scene, a positioning of a physical object in the background scene, or both and generate data indicative of the lighting characteristic, the positioning of the physical object, or both; and a correlative effect system that comprises one or more processors and a memory, accessible by the one or more processors, wherein the memory stores instructions that, when executed by the one or more processors, cause the one or more processors to receive the data and adjust the augmented reality scene based on the data by instructing one or more actuators to reposition the partially reflective surface to provide a virtual object that is lit according to the lighting characteristic and in a position corresponding to the positioning of the physical object.

13. The augmented reality system of claim 12, wherein the background scene comprises a theatre stage and the partially reflective surface comprises a partially mirrored foil.

14. The augmented reality system of claim 12, comprising a display in the background scene configured to mimic a reflection of the augmented reality imagery.

15. The augmented reality system of claim 12, comprising an additional sensor configured to detect an additional lighting characteristic of the augmented reality scene and generate additional data indicative of the additional lighting characteristic, wherein the correlative effect system is configured to receive the additional data and adjust the background scene lighting based on the additional data.

16. The augmented reality system of claim 15, wherein the augmented reality scene comprises a three-dimensional staging area.

17. The augmented reality system of claim 12, wherein the augmented reality scene lighting comprises one or more projectors, one or more liquid crystal displays, one or more lighting panels, or any combination thereof.

18. An augmented reality system, comprising:

a background scene including a three-dimensional staging area and background scene lighting configured to adjustably illuminate the three-dimensional staging area;

an augmented reality scene including augmented reality scene lighting configured to provide augmented reality imagery;

a partially reflective surface positioned relative to the background scene, the augmented reality scene, and an audience to facilitate viewing of the background scene through the partially reflective surface and to facilitate reflection of the augmented reality imagery toward the audience;

a sensor configured to detect a characteristic of the background scene, wherein the sensor is also configured to generate data indicative of the characteristic, and wherein the characteristic comprises a positioning of a physical object in the background scene; and a correlative effect system that comprises one or more processors and a memory, accessible by the one or more processors, wherein the memory stores instructions that, when executed by the one or more processors, cause the one or more processors to receive the data and adjust the augmented reality scene based on the data by instructing one or more actuators to reposition the partially reflective surface to provide a virtual object in a position corresponding to the positioning of the physical object.

19. The augmented reality system of claim 18, wherein the augmented reality scene comprises a display screen, the augmented reality scene lighting comprises lighting of the display screen, the sensor is configured to generate the data being indicative of a lighting characteristic of the background scene, and the correlative effect system is configured to control the lighting of the display screen to provide characteristics of the augmented reality imagery correlative to the data.

20. The augmented reality system of claim 18, wherein the augmented reality scene lighting comprises one or more projectors, one or more liquid crystal displays, one or more lighting panels, or any combination thereof.

\* \* \* \* \*